United States Patent [19]

Geers et al.

[11] 4,166,611
[45] Sep. 4, 1979

[54] RAILWAY VEHICLE SPRING ASSEMBLY

[75] Inventors: Leo Geers, Holzbüttgen; Peter Müskens, Düsseldorf; Dieter Schillings, Neuss, all of Fed. Rep. of Germany

[73] Assignee: Waggonfabrik Uerdingen A.G. Werk Düsseldorf, Düsseldorf, Fed. Rep. of Germany

[21] Appl. No.: 825,826

[22] Filed: Aug. 18, 1977

[30] Foreign Application Priority Data

Sep. 16, 1976 [DE] Fed. Rep. of Germany ....... 2641656

[51] Int. Cl.² .................. B61F 5/30; B61F 5/38; B61F 5/52; F16F 13/00
[52] U.S. Cl. .................. 267/3; 105/218 A; 105/224.1; 280/716
[58] Field of Search ............. 105/165, 218 R, 224.1, 105/167, 218 A; 267/3; 280/716, 718, 80 B, 688, 690, 699

[56] References Cited

U.S. PATENT DOCUMENTS

| | | | |
|---|---|---|---|
| 1,347,878 | 7/1920 | Sisson | 105/165 |
| 2,033,864 | 3/1936 | Piron | 105/224.1 |
| 2,349,601 | 5/1944 | Alber et al. | 105/218 R |
| 2,951,455 | 9/1960 | Candlin, Jr. | 105/167 X |
| 3,220,358 | 11/1965 | Peras | 105/224.1 |
| 3,777,672 | 12/1973 | Schneider | 105/224.1 |
| 3,895,586 | 7/1975 | Willetts | 267/3 |
| 3,984,125 | 10/1976 | Paton et al. | 280/716 |

*Primary Examiner*—Francis S. Husar
*Assistant Examiner*—Howard Beltran
*Attorney, Agent, or Firm*—Michael J. Striker

[57] ABSTRACT

A springing system for a rail vehicle having a frame and a wheel bearing, has two substantially vertical spring elements connectable with the frame or the wheel bearing and located at both sides of the latter, two resiliently yieldable bushings each connected with the respective spring element and located between the latter and the wheel bearing or the frame, respectively, and two resiliently yieldable intermediate elements each located intermediate one of the bushings and the wheel bearing or the frame, respectively. Each of the bushings together with the respective intermediate element forms a stop for absorbing a longitudinal force which is produced during acceleration or deceleration of the vehicle. The springing system also provides for a radial adjustment of the wheels of the vehicle under the action of a friction force between the wheels and the rails when the vehicle moves along a curved path.

12 Claims, 8 Drawing Figures

RAILWAY VEHICLE SPRING ASSEMBLY

BACKGROUND OF THE INVENTION

The present invention relates to a springing system for a rail vehicle. More particularly, it relates to such a springing system of a rail vehicle which includes vertical spring elements.

Springing systems for rail vehicles have been proposed in the art, each including two vertical spring elements located at both sides of a wheel bearing of the vehicle, as considered in the longitudinal direction of the latter. Each of such spring members includes a bell-shaped housing, a resiliently yieldable ring located in the housing, and a conical pin insertable into the resiliently yieldable ring. Such springing system offers the required resistance to vertical shocks and also satisfies the requirements of low wear. However, this system does not provide to a sufficient extent for a soft and shock-less transmission of longitudinal and transverse forces which are of an important nature in rail vehicles (for the comfort of the passengers or for the safety of delicate cargo). Furthermore, since wheels of the rail vehicle must be adjusted radially relative to the center of a curve when the rail vehicle moves along a curved path, the springing system must be so located that a relatively small friction force between the wheels and the rails produces the above adjustment of the wheels. Moreover, it is desirable to avoid an excessively high relative movement between the wheels and a rotational frame or an underframe of the rail vehicle when increased longitudinal forces are produced during acceleration or deceleration of the vehicle, such as those produced during starting or braking of the vehicle.

SUMMARY OF THE INVENTION

Accordingly, it is an object of the present invention to provide a springing system for a rail vehicle, which avoids the disadvantages of the prior art springing systems.

More particularly, it is an object of the present invention to provide a springing system for a rail vehicle, which not only offers requisite resistance to vertical forces applied to the vehicle, but also satisfies the requirements made with respect to the transmission of longitudinal and transverse forces applied to the rail vehicle.

Another feature of the present invention is to provide a springing system for a rail vehicle which is so constructed that, on the one hand, it provides for a radial adjustment of the wheels under the action of a friction force between the wheels and the rails when the vehicle moves along a curved path and, on the other hand, substantially directly transmits a longitudinal force which is produced during acceleration and deceleration of the vehicle.

In keeping with these objects, and with others which will become apparent hereinafter, one feature of the present invention resides, briefly stated, in a springing system for a vehicle having a frame and a wheel bearing, which system has two substantially vertical spring elements located between the frame or the wheel bearing and at both sides of the latter, two resiliently yieldable bushings each connected with the respective spring element and located between the latter and the wheel bearing or the frame, respectively, and two resiliently yieldable intermediate elements each located intermediate one of the bushings and the wheel bearing or the frame, respectively. Each of the bushings together with the respective intermediate element forms a stop for absorbing a longitudinal force which is produced during acceleration or deceleration of the vehicle. This stop may be formed with play or, in the case of a free-from-play construction, can create a desirable spring-force/spring displacement characteristic for the arrangement.

Each spring element may be comprised of a rigid bell-shaped housing, a resiliently yieldable ring located in the housing, and a conical pin which is insertable into the ring. The bushings may be compound rubber-metal bushings, and the intermediate elements may be constituted of rubber.

The springing system for the wheel bearing in accordance with the invention, has great yieldability in horizontal direction, so that longitudinal and transverse forces are softly and shock-lessly transmitted by the system to the vehicle. At the same time the springing system is substantially wear-free and is not subject to contamination. For the above reasons, the springing system has a practically constant characteristic of resilience during its entire service life. Given the particular characteristics of a rubber material of the respective parts of the springing system, the vertical resilience of the springing system depends upon the vertical interval between the resiliently yieldable rings of the spring members and the bushings; further, the resilience of the springing system in the transverse direction depends upon the width of the bushings, and in the longitudinal direction it depends upon the above-mentioned stop. Since the construction provides for radial adjustment of the wheels and is stabilized with respect to the forces which are produced during acceleration and deceleration of the vehicle, the springing system in accordance with the present invention satisfies the requirements made with respect to the rail vehicle.

Another feature of the present invention is that each pin is connected with one of the chassis elements and formed as an angle lever having two arms, one of which arms is connected to one of the chassis elements, whereas the other arm carries the resiliently yieldable intermediate element. This construction provides for an especially economical accommodation of the intermediate elements and easy mounting thereof. Because the forces which are produced during acceleration or deceleration of the vehicle are directed opposite to one another, and, moreover, the rail vehicle moves in two opposite directions, it is understood that the above stop must be doubled or symmetrically located with respect to a vertical middle plane of the wheel bearing.

Still another feature of the present invention is that each intermediate element is located between the other arm of the angle lever and the other chassis element under pre-stress. This creates such a spring force/spring displacement characteristic curve for the arrangement as a whole, that the influence of relatively small disturbing forces resulting from ordinary wheel travel will be suppressed.

An additional feature of the present invention is that the bushing is adjustably connected with the other chassis element, such as by a shaft, which latter is received in the bushing for joint rotation therewith and engaged with a lever which, in turn, connects the shaft with the other chassis element through an eccentric device. This construction provides for a simple and easy adjustment of the wheels parallel to one another during mounting of the springing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
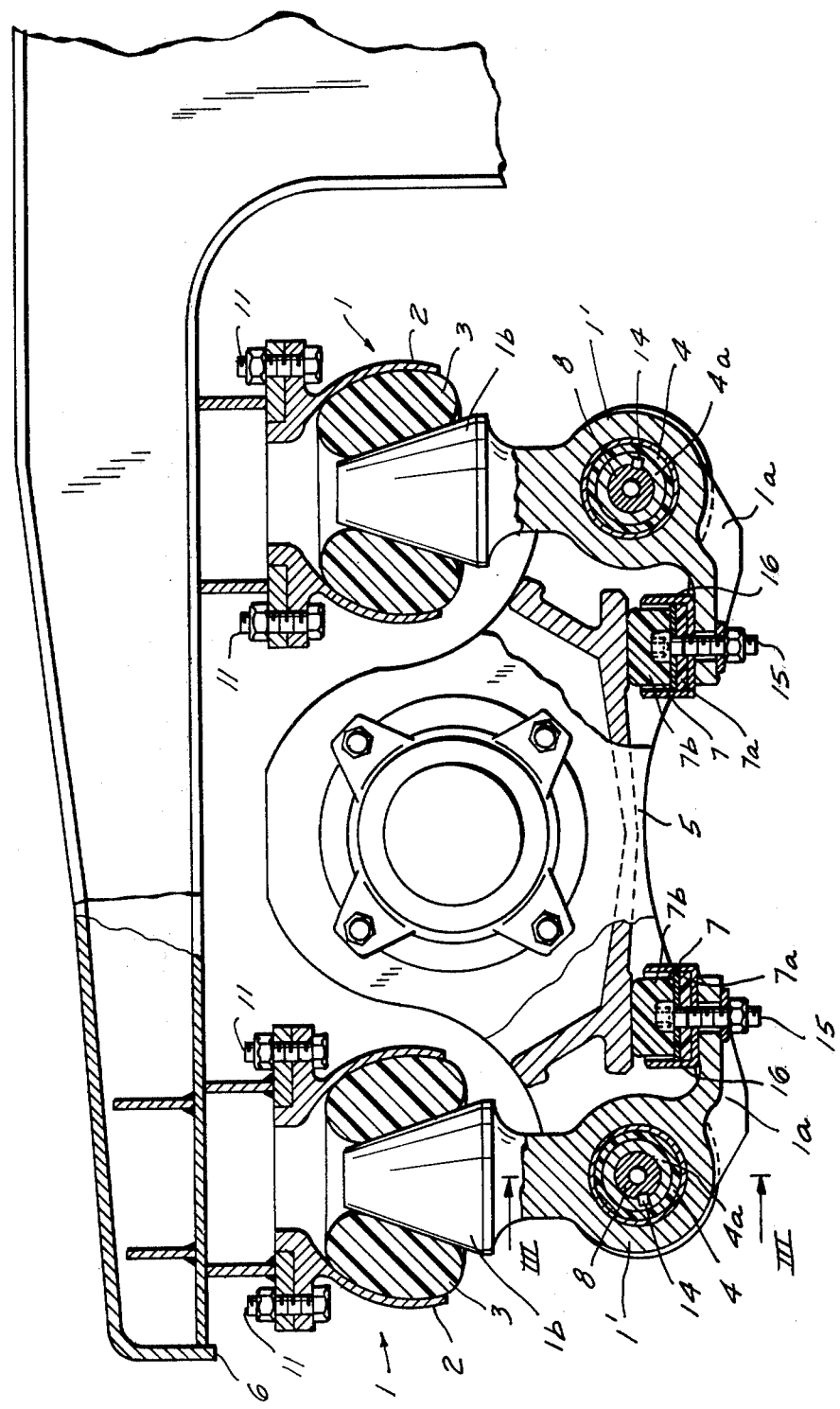
FIG. 1 is a partially sectioned view of a rail-vehicle springing system as a whole, in accordance with the present invention.

A springing system for an axle bearing of a rail vehicle in accordance with the present invention, has two spring elements which are identified in toto by reference numeral 1 and are located at both sides of a vertical middle plane of the wheel bearing 5 of the vehicle, as shown in FIG. 1. Each spring element 1 includes a bell-shaped housing 2, a resiliently yieldable ring 3 located in the housing 2, and a pin 1' insertable into an inner hole of the ring 3. The housing 2 of each of the spring elements 1 is mounted on a frame 6 of a chassis of the vehicle by mounting screws 11, as shown in FIG. 1.

Figure 2:
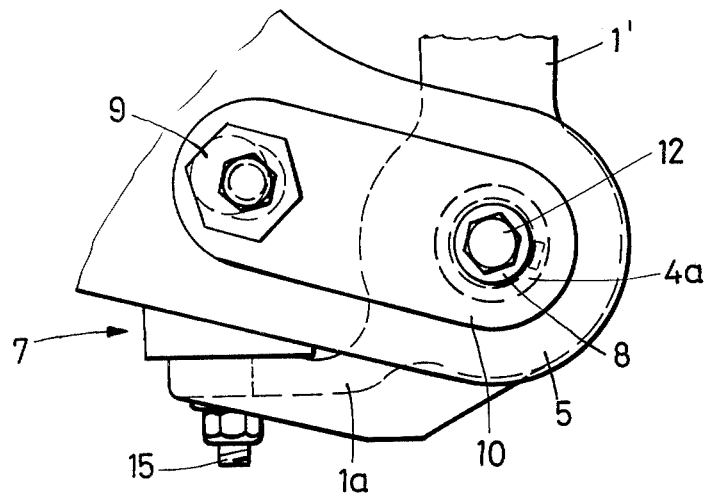
FIG. 2 is a fragmentary view showing a connection of a bushing with a wheel bearing.
Figure 3:
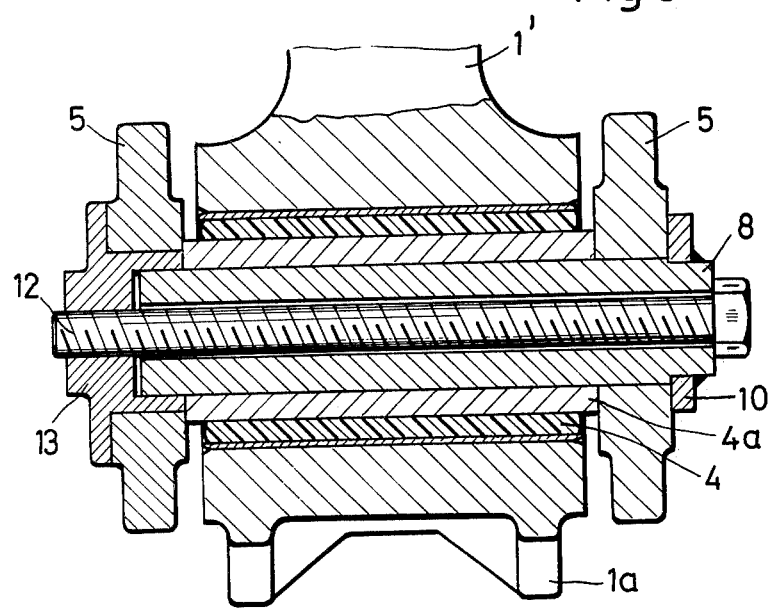
FIG. 3 is a transverse cross-section of a bushing of a springing system in accordance with the present invention.

Each pin 1' has a conical portion 1b by which it can be inserted in the inner hole of the ring 3, and a middle portion which is spaced from the conical portion 1b. A rubber metallic bushing 4 is mounted in the above middle portion of pin 1'. The bushing 4 is resiliently rotatable in the longitudinal direction of the vehicle and therefore is adapted to transmit a force. An inner portion 4a of each of the bushings 4 is braced in a fork-shaped portion of the wheel bearing 5 by a screw 12 and a thrust ring 13, as shown in FIG. 3. The inner portion 4a is further connected with a shaft 8 by a key 14. The shaft 8 carries a lever 10 which is adjustably held on the wheel bearing 5 by an eccentric arrangement 9, as shown in FIG. 2. By an adjustment of both levers 10 the wheel bearing 5 can be moved in the longitudinal direction of the vehicle. In this manner, all the wheels of the vehicle can be adjusted parallel to each other so as to compensate for permissible tolerance deviations of the frame construction.

As particularly shown in FIG. 1, the pin 1' is formed as an angle lever. The conical portion 1b of the angle lever is located at one side of the bushing 4, whereas a second portion or arm 1a of the angle lever is located at the other side of the bushing 4 and carries a resiliently yieldable rubber element 7. The rubber element 7 abuts against the wheel bearing 5. The rubber element 7 is comprised of two elastic layers 7a and 7b, and its resilient characteristics can be adjusted by a tightening screw 15. A casing 16 of the rubber element 7 partially surrounds the latter and limits, in connection with the wheel bearing 5, a resilient yielding of the entire arrangement in the case of an increased deceleration force. When it is desirable for running tests to "switch off" the action of the rubber element 7, this can easily be done by positioning a rigid member between the arm 1a and the wheel bearing 5.

In the springing system, in accordance with the present invention, the resiliently yieldable bushings 4 provide for an adjustment of the wheels of the vehicle under the action of a friction force between the wheels and the rails, when the vehicle moves along a curved path, whereas the rubber element 7 provide for substantially direct transmission of a longitudinal force which is produced during acceleration or deceleration of the vehicle, such as during starting or braking thereof.

FIGS. 4–8 show other embodiments of the present invention. The parts of the springing system shown in these Figures, which are identical to those shown in FIGS. 1–3, are identified by identical reference numerals.

Figure 4:
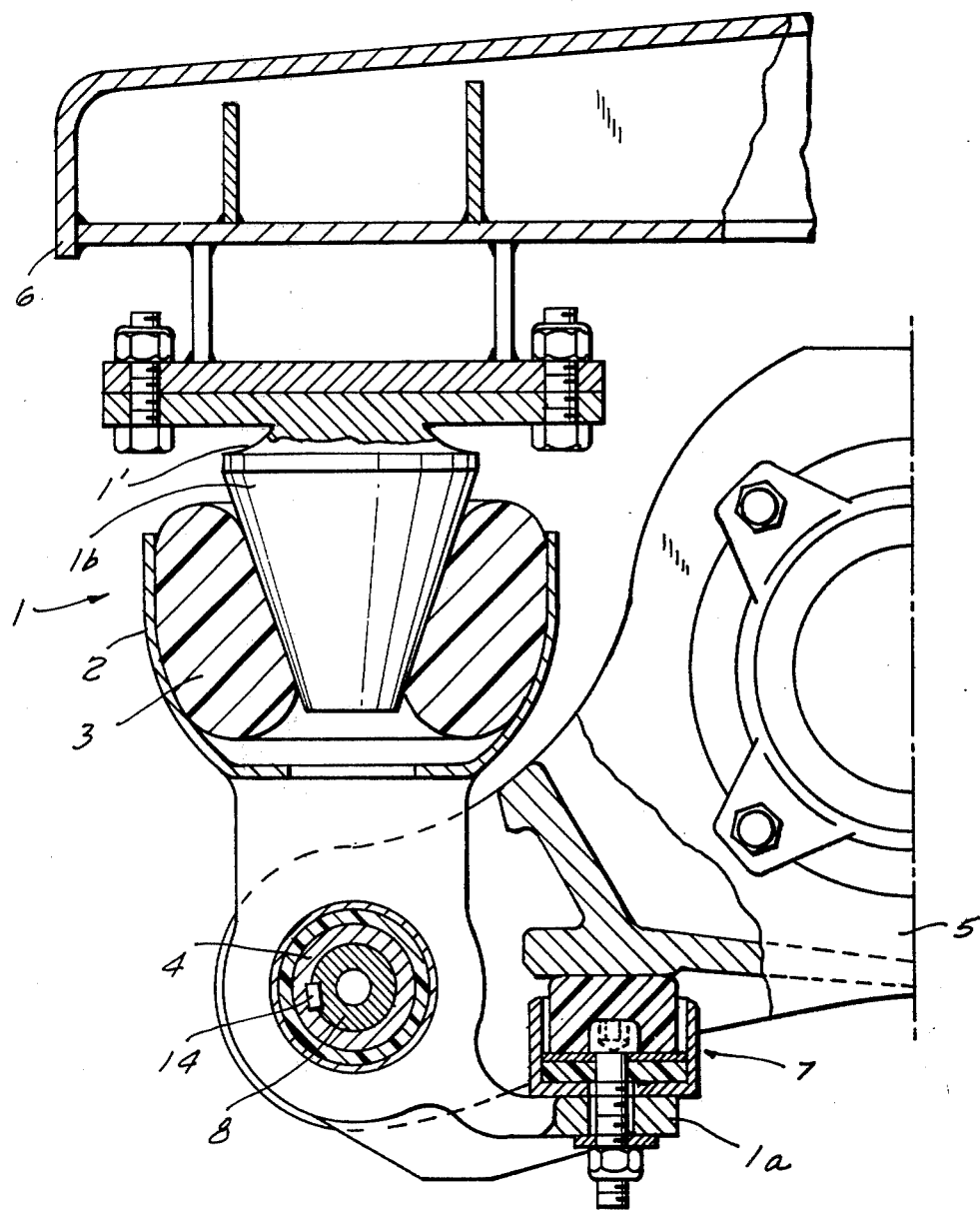
FIG. 4 is a view showing another embodiment of the present invention, where a pin of a spring member is connected with a frame of a vehicle, whereas the housing of the spring member is articulately connected with a wheel bearing.

As shown in FIG. 4, the pin 1' of the spring member 1 may be fixedly connected with the frame 6 of the chassis of the vehicle. The housing 2 of the spring member 1 is articulately connected with the wheel bearing 5 through the bushings 4 and the rubber element 7. The lever is formed by the housing 2 and the arm 1a.

Figure 5:
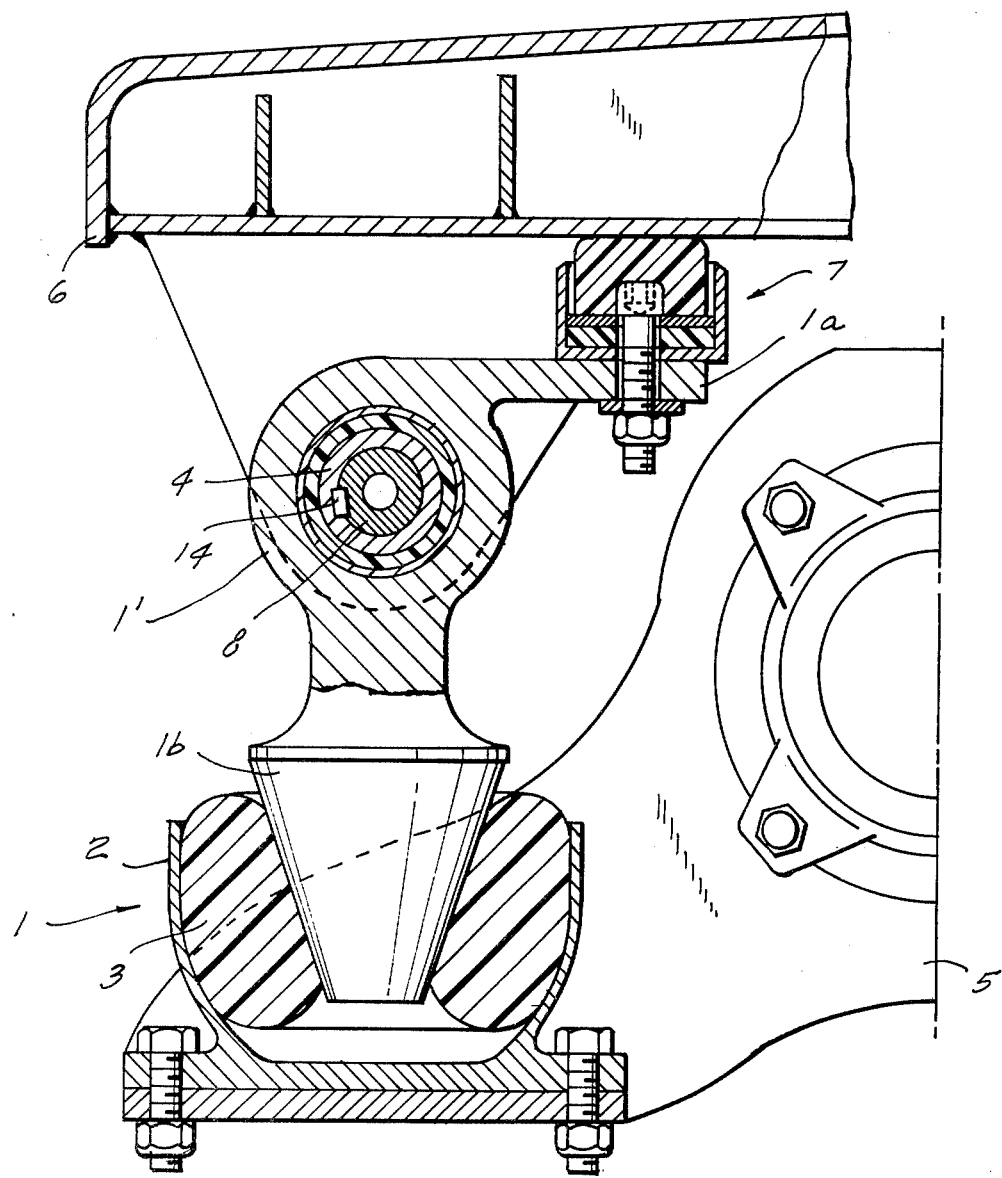
FIG. 5 is a view showing a further embodiment of the present invention, where a housing of a spring member is connected with a wheel bearing, whereas a pin of the spring member is articulately connected to a frame of a vehicle.

In accordance with an embodiment shown in FIG. 5, the housing 2 of the spring member 1 is fixedly connected with the wheel bearing 5, whereas the pin 1' thereof is articulately connected with the frame 6 of the chassis of the vehicle through the bushing 4 and the rubber element 7.

Figure 6:
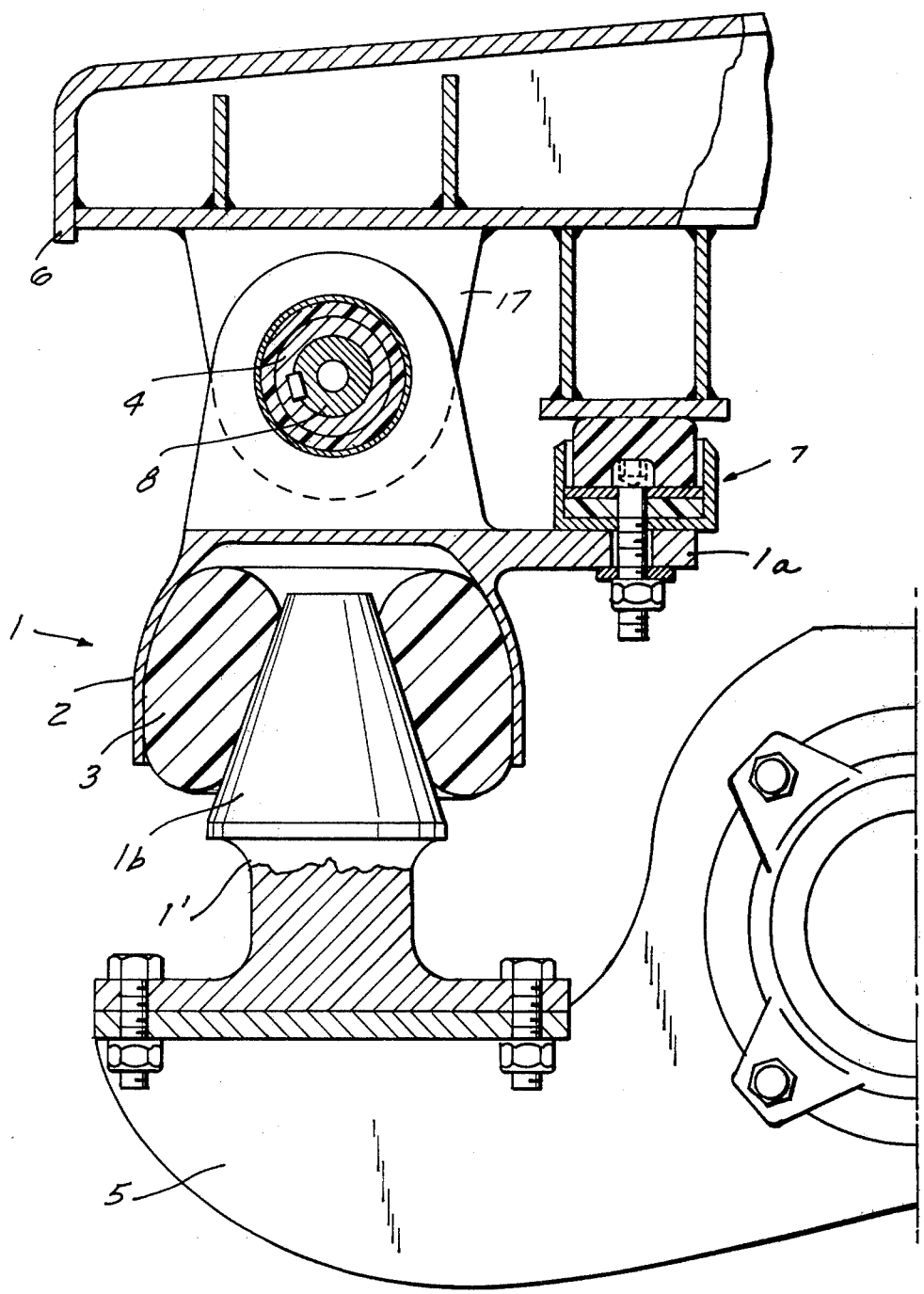
FIG. 6 is a view showing still a further embodiment of the present invention, where a housing of a spring member is connected with a frame of a vehicle through a bushing, whereas a pin is connected with the wheel bearing.

FIG. 6 shows still a further embodiment in accordance with which the housing 2 of the spring member 1 is movably mounted on the frame 6 of the chassis of the vehicle through the bushing 4 and the outer element 7. The bushing 4 is supported by consoles 17. The pin 1' is fixedly connected with the wheel bearing 5. The lever is formed by the housing 2 and the portion 1a.

Figure 7:
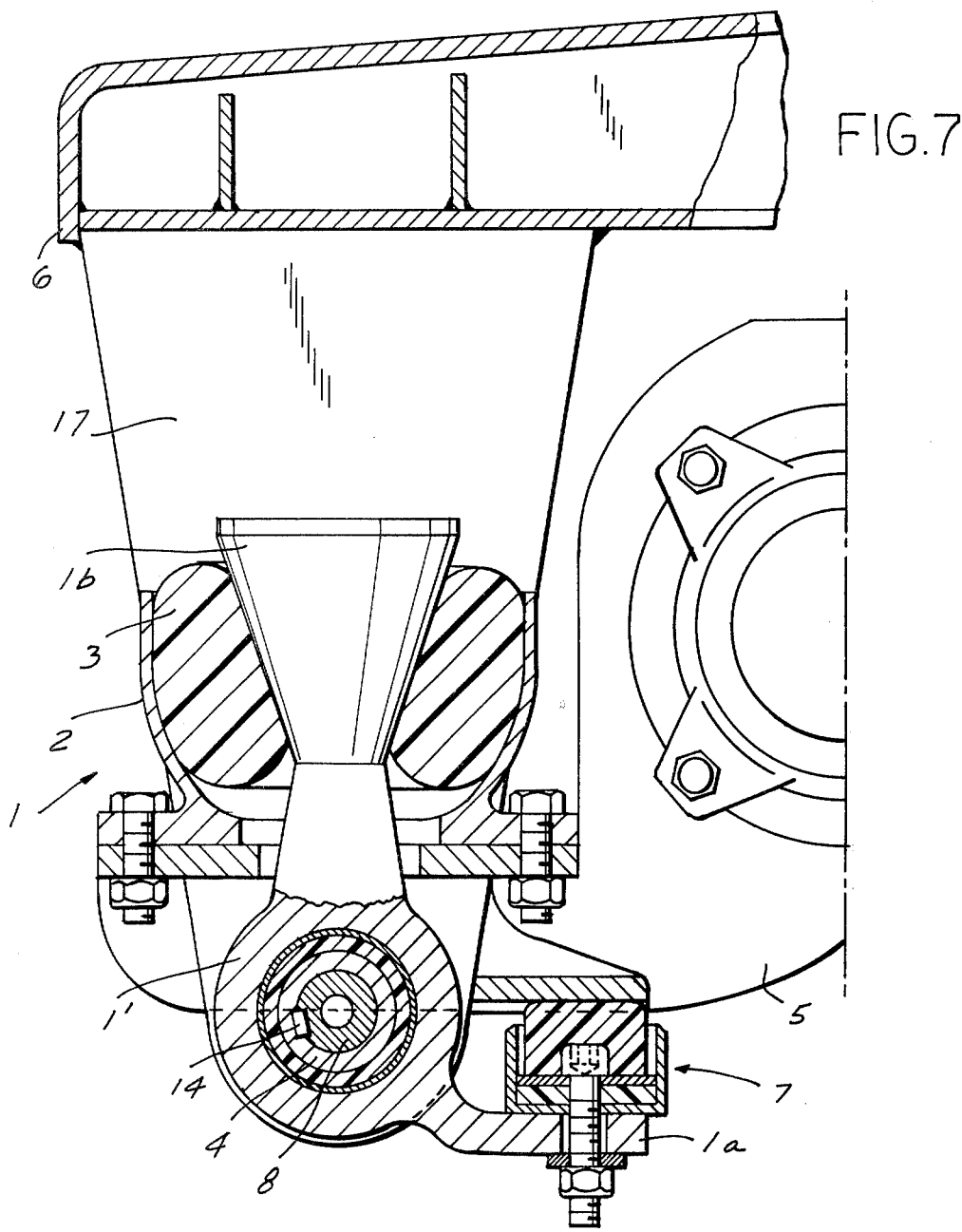
FIG. 7 is a view showing an additional embodiment of the present invention, where a pin of a spring member is articulately mounted on consoles connected with a frame of a vehicle, whereas a housing is connected with the wheel bearing.
Figure 8:
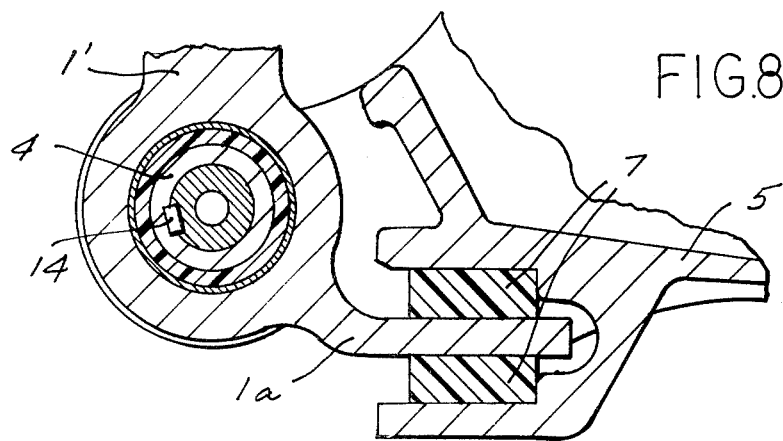
FIG. 8 is a fragmentary view showing a resiliently yieldable intermediate element, whose parts are connected with an arm of a pin of a spring member.

Still one embodiment is shown in FIG. 7, wherein the bushing 4 is held by the two consoles 17 on the frame 6 of the chassis of the vehicle. The housing 2 of the spring member 1 is connected with the wheel bearing 5, whereas the pin 1' is oppositely conical, as compared with that shown in the previous Figures, and is articulately connected with the consoles 17 of the frame 6 through the bushing 4 and the rubber element 7.

In all the above constructions only one of the rubber elements 7 is operative for stabilizing of the arrangement in a certain direction of travel. In an embodiment shown in FIG. 8, a double construction is presented, in which both rubber elements 7 are fixedly connected with the arm 1a of the pin 1', such as by suitable adhesive known per se.

It will be understood that each of the elements described above, or two or more together, may also find a useful application in other types of constructions differing from the types described above.

While the invention has been illustrated and described as embodied in a springing system for a rail vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A springing system for a rail vehicle having a longitudinal direction and two chassis elements which are movable relative to one another and include a frame and a wheel bearing extending transverse to the longitudinal direction of the vehicle, said springing system comprising two double-armed support elements each located at a different side of the wheel bearing, as considered in the longitudinal direction of the vehicle; two substantially vertical spring elements each interposed between a first one of said arms and one of said chassis elements; two bushings on the respective support elements intermediate the respective spring element and the other of said chassis elements and connected to said other chassis elements, said bushings being resiliently yieldable in vertical direction and in said longitudinal direction; and two resiliently yieldable intermediate elements each interposed between a second one of said arms and the other of said chassis elements, so that each of said bushings together with the respective intermediate element forms a stop for absorbing forces produced during acceleration and deceleration of the vehicle and acting in said longitudinal direction.

2. The springing system defined in claim 1, wherein each of said spring elements has two rigid members movable relative to one another in a substantial vertical direction and a resiliently yieldable ring located therebetween; and wherein said support elements are each configurated as an integral member having a central section accommodating one of said bushings, one of said first arms which constitutes one of said rigid members of the respective spring element, and one of said second arms which carries a respective one of said resiliently yieldable intermediate elements.

3. The springing system as defined in claim 1, wherein said bushings are rubber-metal bushings.

4. The springing system as defined in claim 1, wherein said intermediate elements are rubber elements.

5. The springing system as defined in claim 1, wherein each of said bushings is adjustably connected with the other chassis element of the vehicle; and further comprising means for adjustably connecting each of said bushing to the other chassis element.

6. The springing system as defined in claim 5; and further comprising two shafts each of which is received in a respective bushing for joint rotation therewith, said connecting means including levers each engaging the shaft of the respective bushing, and eccentric devices each connecting one of said levers with the other chassis element.

7. The springing system as defined in claim 1, wherein each of said spring elements has two rigid members movable relative to one another in a substantially vertical direction and a resiliently yieldable ring located therebetween, said rigid members including a housing in which said ring is located and a pin insertable into said ring and constituted by one arm of the respective support elements.

8. The springing system as defined in claim 7, wherein each of said bushings is connected with one of said members of the respective spring element, the other member of said spring element being connected with the one chassis element of the vehicle.

9. The springing system as defined in claim 7, wherein said housing is bell-shaped.

10. The springing system as defined in claim 7, wherein said pin has a conical portion insertable into said ring.

11. The springing system as defined in claim 7, wherein said pin is connected with one of said chassis elements and is formed as an angle lever having two arms, one of said arms of said angle lever being connected to the one of the chassis elements and the other arm thereof carrying the respective resiliently yieldable intermediate element.

12. The springing system as defined in claim 11, wherein said intermediate element is located between said other arm of said angle lever and the other chassis element under prestress.

* * * * *